US008949587B2

(12) United States Patent
Tsirkin

(10) Patent No.: US 8,949,587 B2
(45) Date of Patent: Feb. 3, 2015

(54) METHOD FOR DYNAMIC LOADING OF OPERATING SYSTEMS ON BOOTABLE DEVICES

(75) Inventor: Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 230 days.

(21) Appl. No.: 13/469,251

(22) Filed: May 11, 2012

(65) Prior Publication Data

US 2013/0305025 A1    Nov. 14, 2013

(51) Int. Cl.
*G06F 15/177*    (2006.01)
*G06F 9/00*    (2006.01)

(52) U.S. Cl.
USPC ............... 713/2; 718/1; 718/100; 718/104

(58) Field of Classification Search
USPC ........................................ 713/300, 100, 1
See application file for complete search history.

(56) References Cited

U.S. PATENT DOCUMENTS

| 5,237,690 | A | * | 8/1993 | Bealkowski et al. | 713/100 |
|---|---|---|---|---|---|
| 5,353,432 | A | * | 10/1994 | Richek et al. | 710/10 |
| 5,517,646 | A | * | 5/1996 | Piccirillo et al. | 713/1 |
| 5,596,728 | A | * | 1/1997 | Belmont | 710/304 |
| 5,748,980 | A | * | 5/1998 | Lipe et al. | 710/8 |
| 5,768,542 | A | * | 6/1998 | Enstrom et al. | 710/104 |
| 5,793,979 | A | * | 8/1998 | Lichtman et al. | 709/226 |
| 5,974,546 | A | * | 10/1999 | Anderson | 713/2 |
| 5,999,989 | A | * | 12/1999 | Patel | 710/1 |
| 6,038,689 | A | * | 3/2000 | Schmidt et al. | 714/48 |
| 6,161,151 | A | * | 12/2000 | Sudhakaran et al. | 710/10 |
| 6,230,285 | B1 | * | 5/2001 | Sadowsky et al. | 714/14 |
| 6,496,847 | B1 | * | 12/2002 | Bugnion et al. | 718/1 |
| 6,961,941 | B1 | * | 11/2005 | Nelson et al. | 719/319 |
| 7,114,066 | B1 | * | 9/2006 | Swaminathan | 713/1 |
| 7,356,677 | B1 | * | 4/2008 | Rafizadeh | 713/1 |
| 7,716,446 | B1 | * | 5/2010 | Chen et al. | 711/170 |
| 7,818,559 | B2 | * | 10/2010 | Sadovsky et al. | 713/2 |
| 7,840,790 | B1 | * | 11/2010 | Sekhar et al. | 713/1 |
| 8,060,875 | B1 | * | 11/2011 | Lambeth | 718/1 |
| 8,095,929 | B1 | * | 1/2012 | Ji et al. | 718/1 |
| 8,095,931 | B1 | * | 1/2012 | Chen et al. | 718/104 |
| 8,141,075 | B1 | * | 3/2012 | Chawla et al. | 718/1 |
| 2003/0014619 | A1 | * | 1/2003 | Cheston et al. | 713/1 |
| 2003/0033397 | A1 | * | 2/2003 | Gurumoorthy et al. | 709/223 |
| 2003/0084278 | A1 | * | 5/2003 | Cromer et al. | 713/2 |
| 2005/0076324 | A1 | * | 4/2005 | Lowell et al. | 717/100 |
| 2005/0091022 | A1 | * | 4/2005 | Levit-Gurevich et al. | 703/13 |
| 2005/0190699 | A1 | * | 9/2005 | Smith et al. | 370/241 |
| 2006/0155667 | A1 | * | 7/2006 | Tolba | 707/1 |
| 2006/0293936 | A1 | * | 12/2006 | Breiter et al. | 705/8 |
| 2007/0006227 | A1 | * | 1/2007 | Kinney et al. | 718/1 |

(Continued)

OTHER PUBLICATIONS

Compaq Computer Corporation, Phoenix Technologies Ltd., Intel Corporation (Plug and Play BIOS Specification 1.0A, May 5, 1994).*

*Primary Examiner* — Thomas Lee
*Assistant Examiner* — David N Penick
(74) *Attorney, Agent, or Firm* — Lowenstein Sandler LLP

(57) ABSTRACT

A method for booting is provided. A devices manager of a host operating system residing on a host machine (or a boot loader) disables resources of one or more bootable devices having resource conflicts. The device manager enables resources required by one of the one or more bootable device. The device manager initiates booting of the one of the one or more bootable device. If the one of the one or more bootable device fails to boot, the failed bootable device is identified as unavailable for booting.

18 Claims, 4 Drawing Sheets

(56) References Cited

U.S. PATENT DOCUMENTS

| | | | |
|---|---|---|---|
| 2007/0150651 A1* | 6/2007 | Nemiroff et al. | 711/114 |
| 2008/0155332 A1* | 6/2008 | Landers et al. | 714/36 |
| 2009/0013171 A1* | 1/2009 | Gilling | 713/100 |
| 2009/0083529 A1* | 3/2009 | Bandholz et al. | 713/1 |
| 2010/0070705 A1* | 3/2010 | Samuelraj et al. | 711/114 |
| 2012/0102159 A1* | 4/2012 | Luo | 709/220 |
| 2012/0284496 A1* | 11/2012 | Aslot et al. | 713/2 |
| 2013/0227260 A1* | 8/2013 | Tsirkin | 713/2 |

\* cited by examiner

METHOD FOR DYNAMIC LOADING OF OPERATING SYSTEMS ON BOOTABLE DEVICES

RELATED APPLICATION

The present application is related to co-pending U.S. patent application Ser. No. 13/407,971, filed Feb. 29, 2012 entitled "Dynamic OS Load Device Resource Selection", which is assigned to the assignee of the present application.

TECHNICAL FIELD

Embodiments of the present invention relate to a computer system, and more specifically, to a method for dynamic loading of operating systems on bootable devices.

BACKGROUND

Virtualization permits multiplexing of an underlying host machine between different virtual machines. The host computer allocates a certain amount of its resources to each of the virtual machines. Each virtual machine is then able to use the allocated resources to execute applications, including operating systems (referred to as guest operating systems (OS)). The software layer providing the virtualization is commonly referred to as a hypervisor and is also known as a virtual machine monitor (VMM), a kernel-based hypervisor, or a host operating system. The hypervisor emulates the underlying hardware of the host computer, making the use of the virtual machine transparent to the guest operating system and the user of the computer.

Devices employed by a virtual machine require resources, including access to real or virtual memory, input/output (I/O) and other devices. When an attempt is made to boot a guest OS from a bootable virtual device, the guest OS requires a certain amount of memory and I/O resources which may conflict with other guest OSs on other virtual machines vying for the same resources. For example, before a guest OS takes control of resources, the guest OS itself needs to be loaded from a virtual device such as a virtual or real hard drive, virtual or real flash drive, virtual or real optical disk, etc.

Loading a host OS is normally performed by loading firmware, which scans "real" devices in a computing system in some predetermined order, until a bootable device is found and the host OS is loaded and booted from the bootable device. Conventional loading firmware attempts to enable all resources for (supported) devices in a computing system before the OS is loaded, even though only one such device may be used to load the OS, and others may be used by the OS after the OS is loaded. This may create device resource conflicts: for example, each device may need a certain amount of PIO memory, while the total amount of PIO memory in the computing is limited to less than 64 Kbytes.

Loading a guest OS in a virtual environment is normally performed by a hypervisor, which scans "virtual" devices in a computing system in some predetermined order, until a bootable virtual device is found and the virtual OS is loaded and booted from the "bootable" virtual device. Similar guest resource conflicts may arise among guest devices within a virtual machine or between virtual machines. For example, a 32 bit guest can address 4 GBytes of memory. As a result, virtual memory becomes a guest limited resource. Virtual IO ports and interrupt lines are another example.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Methods and systems for booting bootable devices are described herein. In one embodiment, a devices manager of a host operating system residing on a host machine (or a boot loader) identifies a list of bootable devices. The device manager identifies bootable devices in the list that have resource conflicts. The device manager disables resources of the bootable devices having resource conflicts. The device manager selects a bootable device from among the bootable devices. The device manager enables resources required by the selected bootable device. The device manager initiates booting of the selected bootable device. If the selected bootable device fails to boot, the failed bootable device is identified as unavailable for booting. The above steps are repeated until the list is exhausted.

In one embodiment, the bootable devices reside on a host machine, on a virtual machine, residing on the host machine, or on a number of virtual machines, residing on the host machine. Resource conflicts may be a real resource and or virtual resource or both.

In one embodiment, resources not required for booting may be allocated after booting the OS using required allocated resources. Resources not required for booting may include user selected resources or resources unsupported by firmware or both.

In one embodiment, disabling the resources of bootable devices having resource conflicts may include unconditionally disabling device resources associated with all devices in the list of bootable devices.

In one embodiment, selecting a bootable device from among the bootable devices may occur in a predetermined order determined by a boot loader or by a hypervisor.

Embodiments of the present invention may eliminate device conflicts in a virtual environment when multiple virtual machines compete for the same resources at boot time, thereby reducing service requests and improving efficiency. In a non-virtual environment, embodiments of the present invention eliminate the need for user interaction and menus devoted to selecting which devices to boot from and in what order. This simplifies the user-machine interface.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
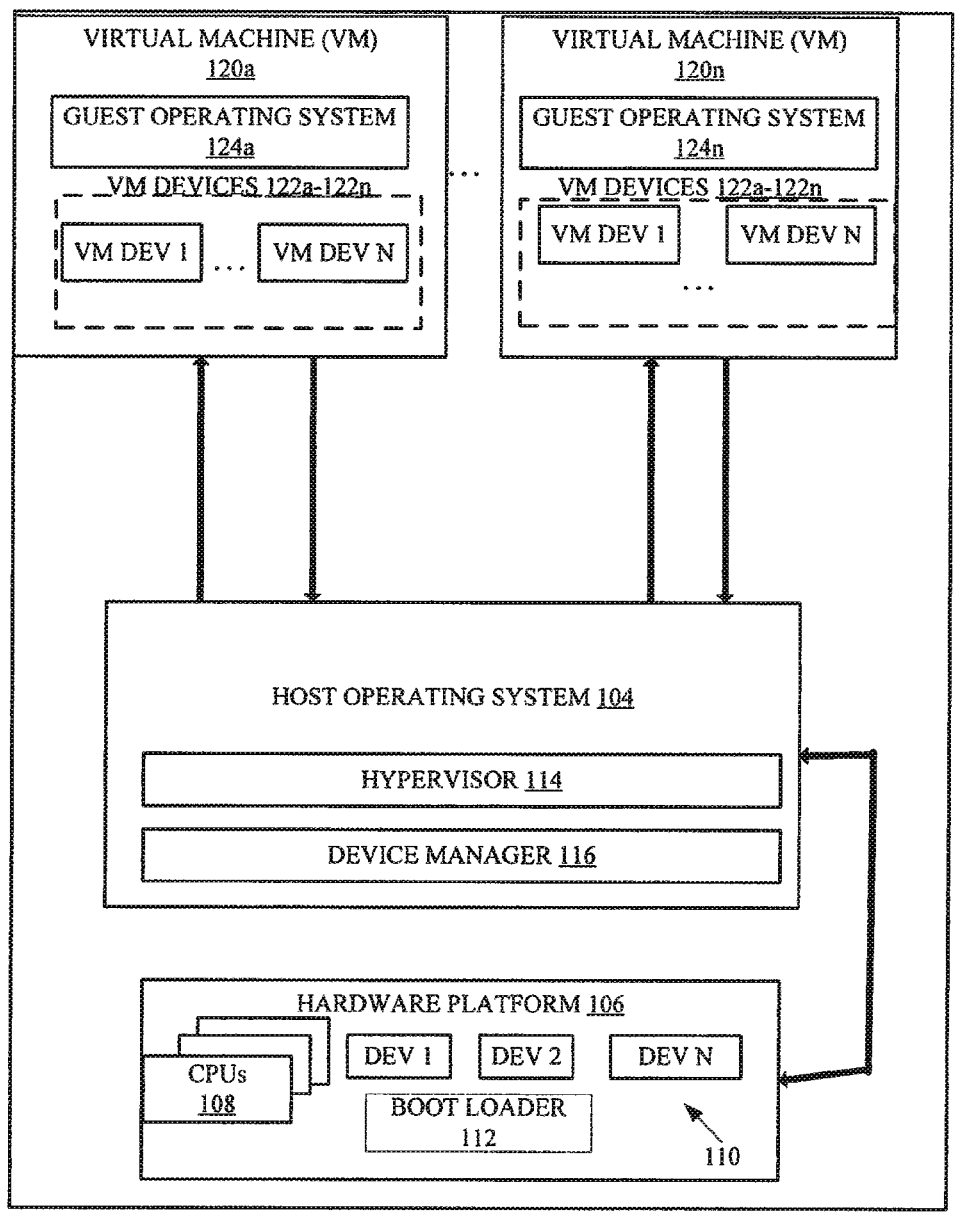
FIG. 1 is a block diagram of a computing system in which embodiments of the present invention may be implemented.

FIG. 1 is a block diagram illustrating one embodiment of a computer system 100, in which embodiments of the present invention may be implemented. The computer system 100 may be a host machine such as, for example, a server computer, a gateway computer or any other suitable computer system that is configurable for operating as a host. The host machine (HM) (also referred to as a host computer system) 100 comprises an operating system 104 and a hardware platform 106. Operating system 104 may include Microsoft Windows®, Linux®, Solaris®, Mac® OS or any other suitable operating system for managing operations on the HM of computer system 100.

The hardware platform 106 may include one or more central processing units (CPUs) 108, devices 110, and boot loader firmware 112. Devices 110 may be comprised of one or more hardware and software devices, which may be located internally and externally to computer system 100. Examples of devices 110 include random-access memory (RAM), non-volatile storage memory (e.g., Flash, EEPROM, solid state drives (SSD), etc.), magnetic storage memory (e.g., one or more hard drives), optical memory (e.g., CDs, DVD, BlueRay drives, etc.), network interface cards (NICs), sound or video adaptors, photo/video cameras, printer devices, keyboards, displays or any other suitable device intended to be coupled to a computer system. One or more of the devices 110 running on the HM 100 may be bootable, i.e., devices from which operating system 104 of the HM may be loaded and made executable by the boot loader (firmware) 112.

The HM 100 may be configured with one or more virtual machines (VMs) 120a-120n. VMs 120a-120n are portions of software that, when executed on appropriate hardware, create an environment allowing the virtualization of an actual physical computer system. Each of VMs 120a-120n may function as a self-contained platform, comprising one or more virtual devices 122a-122n and running a corresponding guest operating system 124a-124n. The guest operating systems 124a-124n in each of the VMs 120a-120n may be the same or different operating system. Similar to the operating system 104, the operating systems 124a-124n may include Microsoft Windows®, Linux®, Solaris®, Mac® OS or any other suitable operating system for managing operations associated with a virtualization environment.

A hypervisor 114, which emulates the underlying hardware platform 106 for VMs 120a-120n, is provided and may run on host operating system 104 of the HM. A hypervisor is also known as a virtual machine monitor (VMM), a kernel-based hypervisor or a host operating system. The hypervisor 114 may support multiple VMs 120a-120n residing on the HM of computer system 100. Alternatively, more than one hypervisor (not shown) may be provided to support multiple VMs 120a-120n residing on the HM 100.

One or more of the virtual devices 122a-122n within a virtual machine (e.g., 120a) may be configured to emulate a bootable device from which to load and execute an operating system (e.g. 124a) of the virtual machine (e.g., 120a). This may be accomplished via a device manager 116 that may provide the same or similar functionality as the boot loader 112.

In the hardware platform 106, the boot loader 112 provides a default or user selectable ordering (via a boot loader menu (not shown)) of the (bootable) devices 110 from which to boot the operating system 104 of the HM. Because of this ordering, the resource requirements (e.g., memory, I/O) of only one of the devices 110 need to be met before loading and executing the host operating system 104 at any one time. In a virtual environment, the hypervisor 114 is configured to impose a predetermined order of booting of the VMs 120a-120n. Unfortunately, this may not be the case for the virtual devices 122a-122n of each of the VMs 120a-120n. Since the virtual devices 122a-122n may vie for the same resources within a VM (e.g., 120a) or between VMs 120a-120n, resource conflicts may result.

To remedy this situation in a virtual environment, the device manager 116 residing in host operating system 104 of the HM may be configured to disable resources required by those virtual devices 122a-122n before imposing a predetermined order to the loading and booting of one or more guest operating systems 124a-124n in each of the VMs 120a-120n. If a selected VM (e.g., 120a) in the predetermined order successfully boots, its resources are provided. This process is repeated for the remaining virtual machines 120b-120n by selecting and attempting to boot another VM (e.g., 120b) in the predetermined order after the resources required of the remaining virtual machines 120b-120n having device conflicts are disabled, etc., until bootable VMs 120a-120n have been tried.

Figure 2:
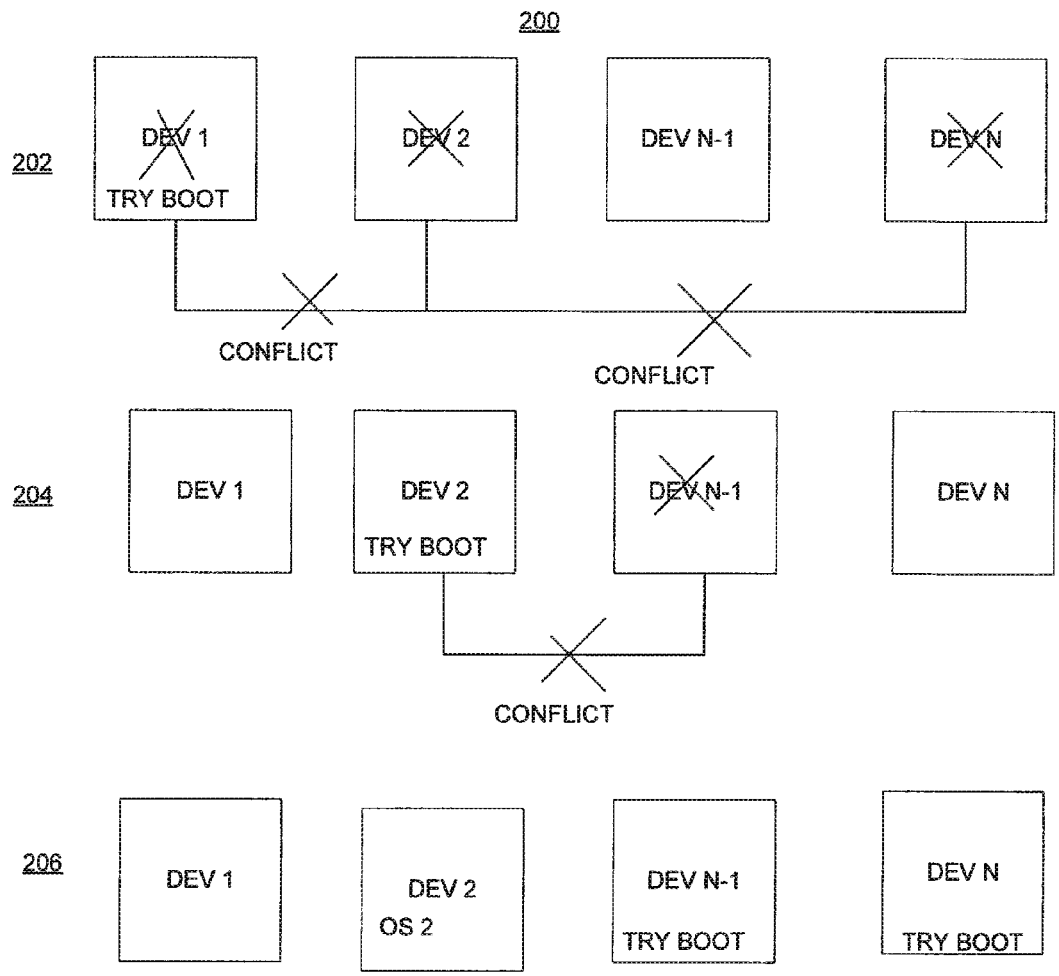
FIG. 2 is a block diagram graphically illustrating one embodiment of a method for booting devices.

FIG. 2 is a block diagram graphically illustrating one embodiment of a mechanism 200 described above for booting devices having resource conflicts. At stage 202, devices 1 through n are checked by the device manager 116 for potential resource conflicts. In the example, resource conflicts may occur among devices DEV 1, DEV 2, and DEV n. In an embodiment, the required resources of devices DEV 2 and DEV n are disabled by the device manager 116, and device DEV 1 may be activated by the device manager 116, request resources, and be booted with a corresponding one of the guest operating systems 124a-124n.

At stage 204, DEV 1 fails to boot. As a result, DEV 1 is removed from the list of bootable devices by the device manager 116. The device manager 116 checks again for conflicts among the remaining bootable devices DEV 2-DEV n. This time DEV 2 and DEV n−1 are found to have conflicts. The resources required by DEV n−1 are disabled by the device manager 116, and DEV 2 may be activated, request resources, and be booted with a corresponding one of the guest operating systems 124a-124n.

At stage 206, DEV 2 boots its operating system. Stage 206 is repeated for the remaining bootable devices (i.e., DEV 3 and DEV 4) until all bootable devices have been loaded and booted with their respective guest OSs (i.e., DEV 2 and DEV N−1) by the device manager 116. At stage 208, any remaining bootable devices not having conflicts may then be booted in any order with their respective guest OSs.

In one embodiment, the mechanism 200 may be modified to boot the host operating system 104 from one of the bootable devices 110 by modifying the boot loader 112 to implement the mechanism 200 if the HM 100 does not include a default ordering or user-selectable list of bootable devices 110.

Figure 3:
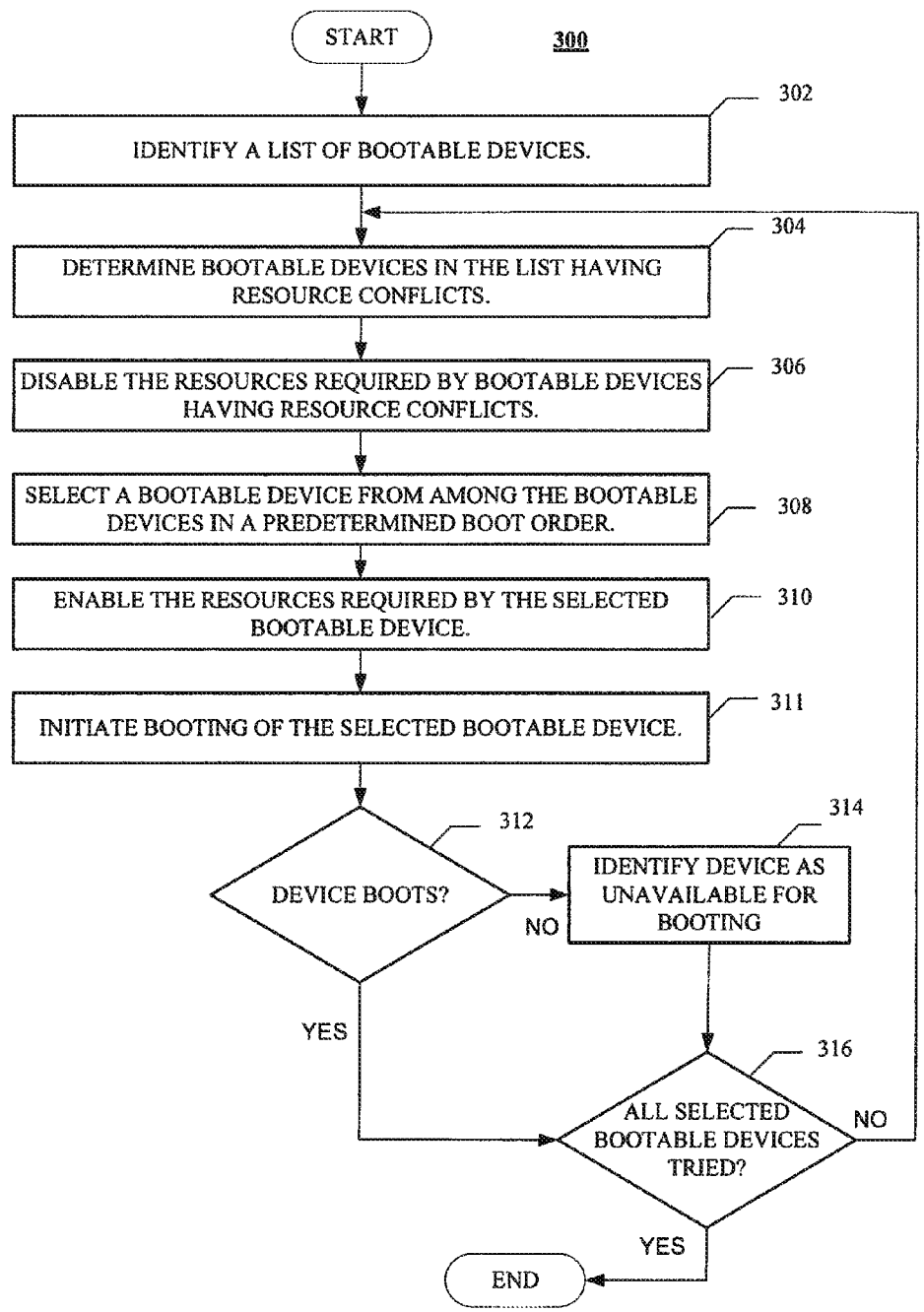
FIG. 3 is a flow diagram illustrating one embodiment of a method for booting devices.

FIG. 3 is a flow diagram illustrating one embodiment of a method 300 for booting devices having resource conflicts. Although the method 300 is described in terms of booting guest OSs 124a-124n on the VMs 120a-120n, the method 300 of FIG. 3 may be applied to the HM 100 under the control of the boot loader firmware 112 to boot the host operating system 104 on the hardware platform 106 from one of the bootable devices 110.

Method 300 may be performed by processing logic (e.g., in computer system 400 of FIG. 4) that may comprise hardware (e.g., circuitry, dedicated logic, programmable logic, microcode, etc.), software (such as instructions run on a processing device), firmware, or a combination thereof. In one embodiment, method 300 is performed primarily by the device manager 116 of the host OS 104 of the HM 100 of FIG. 1.

Referring to FIG. 3, in one embodiment, method 300 begins when, at block 302, a list of bootable devices is identified by the device manager 116. At block, 304, the device manager 116 determines from the list those bootable devices having conflicting resource requirements. These conflicts may arise from virtual devices 122a-122n within one virtual machine (e.g., 120a) or between virtual devices 122a-122n of more than one of the virtual machines 120a-120n.

At block 306, the device manager 116 disables required resources of those bootable virtual devices 122a-122n having any resource conflicts. At block 308, the device manager 116 selects a bootable device (e.g., 122a) from among the bootable devices 122a-122n in a predetermined order selected by the device manager 116. At block 310, the device manager 116 enables the resources required by the selected bootable device. At block 311, the device manager 116 loads a guest OS (e.g., 124a) and attempts to boot the selected bootable device (e.g., 122a) from the guest OS 124a. If, at block 312, the selected OS (e.g., 124a) fails to boot on the bootable device (e.g., 122a), then at block 314, the device 122a that failed to boot the guest OS 124a is removed from the list of bootable devices by the device manager 116.

If, at block 312, the device 122a boots, and at block 316, all of the bootable devices have not yet been tried, then blocks 304-316 of the method 300 are re-executed for remaining bootable devices 122b-122n by the device manager 116. It should be noted that, in one embodiment, when one bootable device 122a has either booted or failed to boot and has been eliminated from the list, then device conflicts are re-checked by the device manager 116 among all of the remaining bootable devices 122b-122n, not only the devices that originally had conflicts, since new conflicts may arise among any of the remaining devices 122b-122n.

In one embodiment, after booting a respective guest OS 124a-124n, the hypervisor 114 may allocate either virtual or real device resources required by the guest operating system 124a-124n. The resources not required for booting may include user selected resources and/or resources unsupported by firmware.

In one embodiment, the device manager 116 may unconditionally disable device resources associated with all devices in the list of bootable devices.

In one embodiment, after performing the method of FIG. 3, the device manager 116 may collect bootable devices that successfully booted into one or more groups. Within each group, the device manager 116 may reorder the successfully bootable devices according to a user-preferred order. The next time the set of bootable devices 122a-122n may be booted (e.g., on system startup), devices within successfully booted groups may be booted first to improve efficiency. In one embodiment, the total set of bootable devices 122a-122n may be arbitrarily grouped into one or more groups and the method of FIG. 3 may be executed on a per group basis.

Figure 4:
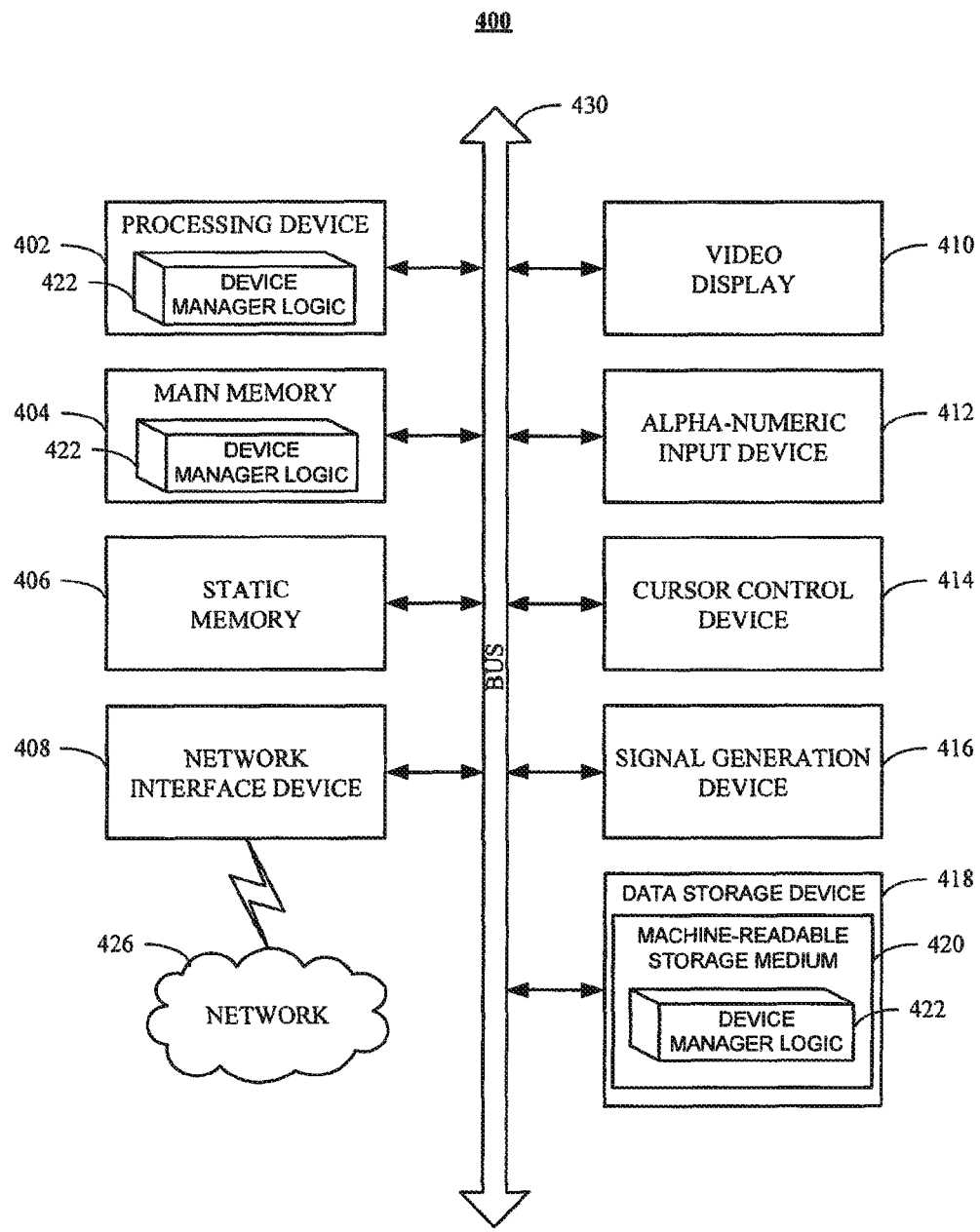
FIG. 4 illustrates a diagrammatic representation of a machine in the exemplary form of a computer system within which a set of instructions, for causing the machine to perform any one or more of the methodologies discussed herein, may be executed.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute device manager logic 422 for performing the operations and steps discussed herein.

Computer system 400 may further include a network interface device 408. Computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

Data storage device 418 may include a machine-readable storage medium (or more specifically a computer-readable storage medium) 420 having one or more sets of instructions (e.g., device manager logic 422) embodying any one or more of the methodologies of functions described herein (e.g., device manager 116 of FIG. 1). Device manager logic 422 may also reside, completely or at least partially, within main memory 404 and/or within processing device 402 during execution thereof by computer system 400; main memory 404 and processing device 402 also constituting machine-readable storage media. Device manager logic 422 may further be transmitted or received over a network 426 via network interface device 408.

Machine-readable storage medium 420 may also be used to store the device queue manager logic persistently. While machine-readable storage medium 420 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
disabling, by a hypervisor of a host processor, resources of a plurality of bootable virtual devices residing on one or more virtual machines, each bootable virtual device of the plurality of bootable virtual devices having a guest operating system thereon and having resource conflicts;
enabling, by the hypervisor, resources required by the guest operating system of a bootable virtual device of the plurality of bootable virtual devices;
initiating booting, by the hypervisor, of the guest operating system of the bootable virtual device; and
responsive to the guest operating system of the bootable virtual device failing to boot, identifying, by the hypervisor, the bootable virtual device as unavailable for booting.

2. The method of claim 1, further comprising, before disabling resources, determining which of the bootable virtual devices of the plurality of bootable virtual devices have resource conflicts.

3. The method of claim 2, further comprising, selecting another bootable virtual device of the plurality of bootable virtual devices and repeating said determining, disabling, enabling, initiating, and identifying until all of the bootable virtual devices of the plurality of bootable virtual devices have been selected.

4. The method of claim 1, wherein the plurality of bootable virtual devices reside on one virtual machine.

5. The method of claim 1, wherein the plurality of bootable virtual devices reside on a plurality of virtual machines.

6. The method of claim 1, further comprising allocating resources not required for booting after initiating booting using required allocated resources.

7. The method of claim 6, wherein resources not required for booting include at least one of user selected resources or resources unsupported by firmware.

8. The method of claim 2, wherein disabling the resources of the the plurality of bootable virtual devices having resource conflicts further comprises unconditionally disabling device resources associated with all virtual devices in a list of bootable virtual devices.

9. The method of claim 1, further comprising selecting a bootable virtual device of the plurality of bootable virtual devices in a predetermined order.

10. The method of claim 1, further comprising:
collecting bootable virtual devices that successfully booted into a group;
reordering the bootable virtual devices in the group according to a preferred order; and
booting the bootable virtual devices in the group upon a subsequent startup of at least one virtual machine associated with the group.

11. The method of claim 10, further comprising:
collecting bootable virtual devices into one or more groups before executing disabling.

12. A system, comprising:
a memory;

a host processor, operatively coupled to the memory, the host processor to:

disable, by a hypervisor of the host processor, resources of a plurality of bootable virtual devices residing on one or more virtual machines, each bootable virtual device of the plurality of bootable virtual devices having a guest operating system thereon and having resource conflicts;

enable, by the hypervisor, resources required by the guest operating system of a bootable virtual device of the plurality of bootable virtual devices;

initiate booting, by the hypervisor, of the guest operating system of the bootable virtual device; and responsive to the guest operating system of the bootable virtual device failing to boot, identify, by the hypervisor, the bootable virtual device as unavailable for booting.

13. The system of claim 12, wherein the hypervisor is further to, before disabling resources, determine which of the bootable virtual devices of the plurality of bootable virtual devices have resource conflicts.

14. The system of claim 13, wherein the hypervisor is further to select another bootable virtual device of the plurality of bootable virtual devices and repeat said determining, disabling, enabling, initiating, and identifying until all of the bootable virtual devices of the plurality of bootable virtual devices have been selected.

15. The system of claim 12, wherein the plurality of bootable virtual devices reside on a plurality of virtual machines.

16. A non-transitory computer-readable storage medium including instructions that, when accessed by a host processor, cause the host processor to perform operations, comprising:

disabling, by a hypervisor of the host processor, resources of a plurality of bootable virtual devices residing on one or more virtual machines, each bootable virtual device of the plurality of bootable virtual devices having a guest operating system thereon and having resource conflicts;

enabling, by the hypervisor, resources required by the guest operating system of a bootable virtual device of the plurality of bootable virtual device devices;

initiating booting, by the hypervisor, of the guest operating system of the bootable virtual device; and responsive to the guest operating system of the bootable virtual device failing to boot, identifying, by the hypervisor, the bootable virtual device as unavailable for booting.

17. The non-transitory computer-readable storage medium of claim 16, further comprising, before disabling resources, determining which of the bootable virtual devices of the plurality of bootable virtual devices have resource conflicts.

18. The non-transitory computer-readable storage medium of claim 17, further comprising:

selecting another bootable virtual device of the plurality of bootable virtual devices and repeating said determining, disabling, enabling, initiating, and identifying until all of the bootable virtual devices of the plurality of bootable virtual devices have been selected.

* * * * *